United States Patent Office 3,766,298
Patented Oct. 16, 1973

3,766,298
PROCESS FOR PREPARING NON-TACKY COUPLED OXYMETHYLENE COPOLYMERS
Francis Borgia McAndrew, Springfield, N.J., assignor to Celanese Corporation, New York, N.Y.
No Drawing. Filed Mar. 1, 1971, Ser. No. 119,960
Int. Cl. C08g 41/04
U.S. Cl. 260—858                    7 Claims

ABSTRACT OF THE DISCLOSURE

Disclosed and claimed herein is a process for preparing improved isocyanate or isothiocyanate coupled oxymethylene copolymers with dissimilar organic polymers which are not tacky. The process comprises forming the isocyanate or isothiocyanate coupled oxymethylene copolymer with the dissimilar organic polymer in the presence of excess free formaldehyde or a small amount of a formaldehyde generating source which will freely generate formaldehyde when mechanically worked at the temperatures necessary for forming the isocyanate or isothiocyanate coupled oxymethylene copolymer with the dissimilar organic polymer.

---

The present invention relates to a process for preparing improved isocyanate or isothiocyanate coupled oxymethylene copolymers with a dissimilar organic polymer which are not tacky. The process comprises forming the isocyanate or isothiocyanate coupled oxymethylene copolymer with the dissimilar organic polymer in the presence of excess free formaldehyde or a small amount of a formaldehyde generating source which will freely generate formaldehyde when mechanically worked at the temperatures necessary for forming the isocyanate or isothiocyanate coupled oxymethylene copolymer with the dissimilar organic polymer.

Oxymethylene polymers are distinguished by a number of excellent properties so that they are suitable for a variety of industrial applications.

For some applications, however, molecular modification of oxymethylene polymers is desirable to provide polymers of modified physical property characteristics.

U.S. Pat. 3,364,157 issued on Jan. 16, 1968 to G. W. Halek et al. discloses modified oxymethylene polymers comprising an oxymethylene polymer coupled to a dissimilar organic polymer having a terminal or pendant group containing active or acidic hydrogen with an isocyanate or isothiocyanate.

According to said U.S. Pat. 3,364,157, the presence of acidic hydrogen may be determined by the Zerewitinoff method, utilizing the reaction of such active, or acidic hydrogen compounds with Grignard reagents, liberating RH corresponding to RMgX. Thus, when a compound containing acidic hydrogen is reacted with methyl magnesium iodide, methane is liberated, giving a positive test. The amount of liberated methane may be collected and measured, and the number of active hydrogen atoms per mole determined, where the molecular weight is known. A further description of the Zerewitinoff test including modifications of the procedure for various applications, can be found in Grignard Reactions of Non-Metallic Substances, Kharasch, M. S., and Reinmuth, O. (Prentice-Hall, Inc., New York, 1954), pp. 1166–1174.

Further, according to the teachings of said U.S. Pat. 3,364,157, these modified oxymethylene polymers may be prepared by reacting an oxymethylene copolymer with a dissimilar organic polymer having terminal or pendant isocyanate or isothiocyanate groups, or by the mutual reaction of an oxymethylene copolymer, a dissimilar organic polymer containing active or acidic hydrogen groups, and an isocyanate or isothiocyanate.

While modified oxymethylene copolymers produced by such methods have many desirable properties they are deficient in that molded or extruded articles prepared therefrom are tacky.

The present invention is based on the discovery that the tackiness of modified oxymethylene copolymers prepared by the coupling reaction of an oxymethylene copolymer and a dissimilar organic polymer with an isocyanate or isothiocyanate may be eliminated by forming the modified oxymethylene copolymer in the presence of excess free formaldehyde or a small amount of a formaldehyde generating source which will freely generate formaldehyde when mechanically worked at the temperatures necessary for forming the modified oxymethylene copolymer.

This discovery is surprising being that the oxymethylene copolymer itself when mechanically worked at the temperatures necessary for forming the modified oxymethylene copolymer will generate formaldehyde. However, it has been found that this generation by itself is insufficient for producing non-tacky modified oxymethylene copolymers, and that the incorporation of an additional formaldehyde generating source which will freely generate formaldehyde when mechanically worked at the temperatures necessary for forming the modified oxymethylene copolymer is necessary for producing non-tacky modified oxymethylene copolymers according to the instant invention.

THE OXYMETHYLENE COPOLYMER

Oxymethylene copolymers, which are adapted for use according to this invention are those which are prepared as described in U.S. Pat. No. 3,027,352 of Walling et al. by copolymerizing, for example, trioxane with any various cyclic ethers having at least two adjacent carbon atoms, e.g., ethylene oxide, dioxolane, and the like.

Thus, the oxymethylene copolymer used in carrying this invention into effect may be a polymer having a structure comprising recurring units represented by the general formula (I)
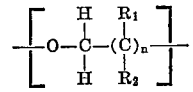

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from 85 to 99.9 mole percent of the recurring units. Each lower alkyl radical preferably has from one to two carbon atoms, inclusive. The oxymethylene copolymer may be defined more specifically as a normally solid, substantially water-insoluble copolymer, the repeating units of which consist essentially of (A) —$OCH_2$— groups interspersed with (B) groups represented by the general formula (II)
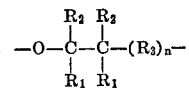

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted radicals, and $n$ is an integer from zero to three inclusive.

Each lower alkyl radical preferably has from one to two carbon atoms, inclusive. The —$OCH_2$— units of (A) constitute from 85 to 99.9 mole percent of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene and lower alkyl and haloalkyl-substituted oxymethylene radicals, and $n$ is an integer from zero to three inclusive. Each lower alkyl radical preferably has from one to two carbon atoms inclusive.

The preferred cyclic ethers used in the preparation of the oxymethylene copolymers are ethylene oxide and 1,3-dioxolane, which may be represented by the formula (IV) 

wherein $n$ represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers described briefly above are members of the broader group of such copolymers that are useful in practicing the present invention and which have at least one chain containing recurring oxymethylene units interspersed with —OR— groups in the main polymer chain. In such —OR— groups, R represents a divalent radical containing at least two carbon atoms linked directly to each other and positioned in the polymer chain between the two valences with any substituents on said radical being inert, that is, substituents that are free from interfering functional groups and do not induce undesirable reactions under the conditions involved. Among such copolymers that advantageously may be employed in practicing this invention are oxymethylene copolymers containing from about 60 mole percent to 99.9 mole percent of recurring oxymethylene groups to from 0.1 mole percent to about 40 mole percent of —OR— groups. As indicated hereinbefore, the most preferred copolymers are those having from about 85 mole percent to 99.9 mole percent of recurring oxymethylene groups and from about 0.1 to 15 mole percent of —OR— groups. In a preferred embodiment R may be, for example, an alkylene or substituted alkylene group containing at least two carbon atoms.

Also useful in carrying the instant invention into effect are oxymethylene copolymers having a structure comprising recurring units consisting essentially of those represented by the general formula (V) 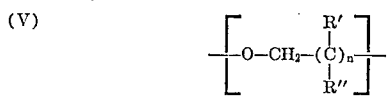

wherein $n$ represents an integer from 0 to 5, inclusive, and representing 0 (zero) in from 60 to 99.6 mole percent of the recurring units; and $R'$ and $R''$ represent inert substituents, that is, substituents which are free from interfering functional groups and will not induce undesirable reactions. Thus, one advantageously may utilize oxymethylene copolymers having a structure comprising oxymethylene and oxyethylene recurring units wherein from 60 to 99.9 mole percent of the recurring units are oxymethylene units.

It has previously been indicated that especially preferred copolymers employed in practicing the present invention are those containing in their molecular structure oxyalkylene units having adjacent carbon atoms which are derived from cyclic ethers having adjacent carbon atoms. Such copolymers may be prepared by copolymerizing trioxane or formaldehyde with a cyclic ether represented by the general formula (VI) 

wherein $n$ represents an integer from zero to 4, inclusive, and R represents a divalent radical selected from the group consisting of (a) $CH_2$, (b) $CH_2O$, and (c) any combination of $CH_2$ and $CH_2O$.

Examples of specific cyclic ethers that may be used in preparing copolymers of the kind embraced by Formula VI, in addition to the cyclic ethers previously mentioned with reference to the copolymers embraced by Formula IV, and of acetals and cyclic esters that may be employed instead of cyclic ethers, are 1,3,5-trioxepane, 1,3-dioxepane, betapropiolactone, gammabutyrolactone, neopentyl formal, pentaerythritol diformal, paraldehyde, and butadiene monoxide. In addition, glycols including, for example, ethylene glylcol, diethylene glycol, 1,3-butylene glycol, propylene glycol and the like may be employed instead of the cyclic ethers, acetals and esters just mentioned.

Although formaldehyde is a desirable source of the oxymethylene moiety (i.e., $R_2O$ wherein $R_2$ represents methylene or substituted methylene), it will be understood, of course, by those skilled in the art that instead of formaldehyde, other sources of the oxymethylene moiety may be used; e.g., paraformaldehyde, trioxane, acetaldehyde, propionaldehyde, and the like. One may also employ cyclic acetals, e.g., 1,3,5-trioxepane, in lieu of both the cyclic ether and formaldehyde.

Also, as used in the specification and claims of this application, the term "copolymer" means polymers obtained by copolymerization of two or more different monomers (i.e., polymers containing in their molecular structure two or more different monomer units), and includes terpolymers, tetrapolymers and higher multicomponent polymers. The term "polymer" (unless it is clear from the context that the homopolymer of a copolymer is intended) includes within its meaning both homopolymers and copolymers.

In some cases it is especially desirable to use oxymethylene terpolymers as the oxymethylene copolymer component according to this invention, e.g., in making molding compositions especially adapted for use in making blow-molded or otherwise shaped articles, e.g., bottles or other types of containers. Oxymethylene terpolymers that are particularly useful in such applications, as well as for other purposes, include those disclosed in Great Britain Pat. 1,026,777 issued to W. E. Heinz and F. B. McAndrew on Apr. 20, 1966, assigned to the same assignee as the instant invention, and which by this cross-reference is made a part of the disclosure of the present application.

The oxymethylene copolymers that are modified according to this invention are thermoplastic materials having a molecular weight of at least 10,000, a melting point of at least 150° C., and an inherent viscosity of at least 1.0 (measured at 60° C. in a 0.1 weight percent solution in p-chlorophenol 2 weight percent of alpha-pinene).

The oxymethylene copolymer component used in this invention may be, if desired, oxymethylene copolymers that have been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in Canadian Pat. 725,734 issued to Frank M. Berardinelli on Jan. 11, 1966, assigned to the same assignee as the present invention, and by this cross-reference is made a part of the disclosure of the instant application.

While up to as much as 100% of the polymeric chains of the oxymethylene copolymers may contain terminal hydroxymethyl or hydroxyalkyl groups (i.e., hydroxy bonded to methylene or higher alkylene groups) the oxymethylene copolymers may also contain active hydrogen-containing groups bonded to or adjacent copolymeric units derived from the comonomers described above.

THE DISSIMILAR ORGANIC POLYMER

The dissimilar organic polymer which may be used according to the instant invention are those which contain at least one pendant or terminal isocyanate or isothiocyanate groups for direct reaction with the oxymethylene copolymer, or those which contain at least one pendant or terminal active or acidic hydrogen containing groups, as determined by the Zerewitinoff method, which will undergo a mutual coupling reaction with the oxymethylene copolymer in the presence of an isocyanate or isothiocyanate coupling agent.

Representative organic polymeric materials suitable according to the instant invention include those having hydroxy, amino, amido, carboxy, mercapto, thiocarbonyl or other active hydrogen containing substituents, such as the polyethers, including, for example, the polymers and copolymers derived from ethylene glycol; propylene glycol; butylene glycol; pentamethylene glycol; heptamethylene glycol; octamethylene glycol; nonamethylene glycol; decanediol; 1,2-propylene glycol; 1,4-butylene glycol; 1,6-hexanediol; methylhexanediol; 1,4-butenediol; 2,2-dimethyl-1,3-propylene glycol; polystyrene glycol; the polyacetals, cellulose and its derivatives, such as the cellulose esters; polyesters (containing both hydroxy and carboxy groups), such as polyethylene terephthalate, poly (1,4-cyclohexanedicarbonyl terephthalate); polytetramethylene sebacate; the polycarbonates, such as poly [2,2-propane-bis (4-phenyl carbonate)]; polyamides, such as the polysulfonamides, polycarbonamides, such as polyhexamethylene diamine adipate and the corresponding N-methoxylated polymers, etc.; mercapto containing polymers, such as the polythiomethylenes; the polyurethanes and mixtures and copolymers of the foregoing. Of course, each of the foregoing polymers may contain hydroxy, amino, etc. substituent groups at the terminus of the polymeric chain or at some intermediate position. Moreover, suitable polymers include those having a variety of active hydrogen containing substituents.

Thus, the suitable polymeric co-blocks include those having a polymeric backbone consisting of recurring atoms selected from the group consisting of oxygen, sulfur, carbon and nitrogen atoms comprising the hydrocarbon, oxahydrocarbon, thiahydrocarbon, amino hydrocarbon saturated and unsaturated polymers, etc. and which contain active-hydrogen-containing groups bonded to aliphatic, cycloaliphatic, and aromatic groups including those containing heteroatoms selected from the group consisting of nitrogen, oxygen and sulfur, e.g., polyethylene glycol contains hydroxyaliphatic terminal groups; polyethylene terephthalate contains carboxyaromatic groups and hydroxyaralkyl groups; the polythiomethylenes contain mercaptoalkyl terminal groups; polyethylene diamine contains aminoaliphatic groups; the cellulose esters contain glucopyranose units having hydroxy groups bonded to an alkylheterocyclic moiety (where the hetero atom is oxygen) and hydroxy groups directly bonded to the heterocyclic moiety; the polycarbonates contain hydroxy-aromatic groups, etc.

Representative organic polymeric materials which contain at least one terminal or pendant isocyanate or isothiocyanate groups for direct reaction with the oxymethylene copolymer are the reaction products of any of the aforementioned organic polymeric materials with an isocyanate or isothiocyanate with a functionality of at least two.

THE COUPLING AGENT

The coupling agents are suitably bifunctional compounds having at least one isocyano (—NCO) or isothiocyano (—NCS) group, and preferably are organic diisocyanates, (OCN—R—NCO), diisothiocyanates $$(SCN—R—NCS)$$

or isocyanateisothiocyanates (OCN—R—NCS), but may also be of higher functionality (e.g., triisocyanates, polyisocyanates, etc.).

A preferred class of coupling agents has the general formula $R(—NCX)_n$ wherein X is an atom selected from the group consisting of oxygen and sulfur, $n$ is an integer between 2–3, and R is an organic radical derived from the group consisting of aliphatic, cycloaliphatic and aromatic moieties having one to twenty carbon atoms, and substituted derivatives thereof, where the substituents are inert i.e., do not participate in undesirable side reactions.

Suitable compounds include, for example, aromatic diisocyanates, such as 2,4-toluene diisocyanate; 2,6-toluene diisocyanate; 1,6-toluene diisocyanate; diphenyl methane 4,4'-diisocyanate; 3,3'-dimethyl diphenyl methane 4,4'-diisocyanate; 3,3'-dimethyl 4,4'-diphenylene diisocyanate (3,3-bitoluene 4,4'-diisocyanate); m-phenylene diisocyanate; p-phenylene diisocyanate; o-phenylene diisocyanate; methane diisocyanate; chlorophenylene-2,4-diisocyanate; chlorophenylene 2,4-toluene diisocyanate; 3,3'-dichlorodiphenyl-4,4'-diisocyanate; 4-chloro-1,3-phenylene diisocyanate; xylene 1,4-diisocyanate; dixylylene methane 4,4'-diisocyanate; 1,5-naphthalene diisocyanate, 1,4-naphthalene diisocyanate, and the corresponding diisothiocyanates and the isocyanateisothiocyanates; alkylene diisocyanates, such as 1,6-hexamethylene diisocyanate; 1,2-ethylene diisocyanate; 1,3-propylene diisocyanate; 1,4-tetramethylene diisocyanate; 1,5-pentamethylene diisocyanate; and the corresponding diisocyanates and the isocyanate-isothiocyanates; alkylidene diisocyanates, such as ethylidene diisocyanate and propylidene diisocyanate and the corresponding diisothiocyanates and the isocyanate-isothiocyanates; cycloaliphatic diisocyanates, such as 1,3-cyclohexylene diisocyanate; 1,3-cyclopentylene diisocyanate; 1,4-cyclohexylene diisocyanate; 4,4'-methylenebis-(cycloheylene diisocyanate; 1,3-cyclopentylene diisocyanate; and isocyanate-isothiocyanates; triisocyanates, such as triphenyl methane triisocyanate; 1,3,5-benzene triisocyanate, and the corresponding isothiocyanates and isocyanate-isothiocyanates. Mixtures of any of the aforementioned compounds, such as mixtures of the 2,4 and 2,6 isomers of toluene diisocyanate, may also be desirable in certain applications.

Other bifunctional coupling agents are the combinations of a biscarbamyl chloride of a diprimary diamine and a diprimary amine, and phosgene and a diprimary amine.

THE EXCESS FORMALDEHYDE SOURCE

The excess formaldehyde source which may be used according to the instant invention may be excess free formaldehyde or a small amount of any formaldehyde generating source which will freely generate formaldehyde when mechanically worked at the temperatures necessary for forming the non-tacky modified oxymethylene copolymers according to the instant invention.

Thusly, free formaldehyde may be introduced into the reaction mixture of the reactive components used for forming the modified oxymethylene copolymers according to the instant invention, or a small amount of a formaldehyde generating source which will freely generate formaldehyde when mechanically worked at the temperatures necessary for forming the modified oxymethylene copolymers, according to the instant invention, may be incorporated into the reaction mixture of the reactive components used for forming the modified oxymethylene copolymers according to the instant invention.

Typical of formaldehyde generating sources which will freely generate formaldehyde when mechanically worked at the temperatures necessary for forming the modified oxymethylene copolymers according to the instant invention, are unstabilized oxymethylene homopolymers prepared by the homopolymerization of formaldehyde or trioxane. Typical of such oxymethylene homopolymers, and a method for their production is contained in U.S. Pat. 2,768,994, among others. They have a molecular weight of up to about 10,000, preferably from about 200 to about 3,000.

Other suitable formaldehyde generating sources which may be used according to the instant invention are the hemiacetals of formaldehyde with alcohols such as cyclohexanol, butyl alcohol, allyl alcohol and the like.

The coupling reaction may be carried out in an emulsion, suspension or solution system but preferably a melt system is employed wherein all of the reactants, i.e., the oxymethylene copolymer, the dissimilar organic polymer and the isocyanate or isothiocyanate are mechanically worked in the liquid state, i.e., on a two roll mill or in a single or double screw extruder or the like. Generally temperatures between from about 100° C. to 275° C. are employed, with the range of from about 150° C. to about 250° C. being preferred for a melt state of the preferred oxymethylene copolymers. Lower temperatures in the suitable ranges are particularly preferred.

The coupling reaction medium is preferably substantially anhydrous with a water content below about 0.3 weight percent based upon the total weight of reactants, preferably below about 0.3 weight percent based upon the total weight of reactants, preferably below about 0.1 weight percent, and most preferably below from about 0.01 about 0.04 weight percent.

The isocyanate or isothiocyanate may be provided in variable amounts but preferably it is provided in amounts between from about 0.5 mole to about 3.0 moles and most preferably between from about 0.8 mole to about 1.2 moles of isocyano, or isothiocyano groups per mole of active hydrogen, defining one gram of active hydrogen as equal to one mole thereof.

The amounts of oxymethylene copolymer and dissimilar organic polymer may be provided in variable ratios to allow modification in properties of the produced copolymer, but preferably they are provided in such a ratio so as to produce a copolymer containing from about 20 to about 80 weight percent of oxymethylene copolymer, based upon the total weight of the reactive components, and most preferably from about 40 to about 60 weight percent.

The excess formaldehyde or formaldehyde generating source may be provided in amounts up to about 10 weight percent, based upon the total weight of reactive components, preferably from about 0.1 to about 2 weight percent.

In producing the non-tacky modified oxymethylene copolymer of the instant invention by the coupling reaction of the oxymethylene copolymer and the dissimilar organic polymer with the isocyanate or isothiocyanate, if desired a catalyst may be added to enhance the reaction rate of the coupling reaction. Suitable catalysts include basic substances, free of interfering active hydrogen atoms, such as alkali metals, e.g., sodium, the alkali metal alkoxide, Friedel-Crafts metal halides etc., or tertiary amines including such compounds as triethylamine, tributylamine, and triethanolamine, or most preferably organic tin compounds such as dibutyltin dilaurate or stannous octoate.

The catalyst may be provided in amounts from about 0.0005 to about 0.05 weight percent, based upon the total weight of reactants, and preferably from about 0.005 to about 0.015 weight percent.

The modified oxymethylene copolymer may also contain if desired, reinforcing agents, fillers, pigments, dyes, nucleating agents, stabilizers such as phosphite materials, antioxidants, or the like.

In order that those skilled in the art may better understand how the present invention may be carried into effect the following examples are given by way of illustration and not by way of limitation.

EXAMPLE I

The oxymethylene copolymer used in this example is a trioxane-ethylene oxide copolymer containing about 2 weight percent of comonomer units derived from ethylene oxide. It is prepared as previously has been broadly described herein and more specifically in the cited prior art, e.g., the aforementioned Walling et al. Pat. No. 3,027,352. It has an inherent viscosity (I.V.) of about 1.2 (measured at 60° C. in 0.1 weight percent solution in p-chlorophenol containing 2 weight percent of alpha-pinene). It has a melt index of about 9.0. (The apparatus used and method of determining melt index are described in ASTM D–1238–57T.) It contains 0.5 weight percent of 2,2'-methylene bis-(4-methyl-6-t-butyl phenol), 0.03 weight percent of melamine and 0.1 weight percent of cyanoguanidine as stabilizers.

25 grams of this oxymethylene copolymer and 25 grams of Texin 591A sold by Mobay Chemical Company, which is an isocyanate end capped polyurethane prepared from polybutanediol adipate, ethylene glycol and diphenyl methane 4,4'-diisocyanate, said polyurethane having an inherent viscosity of 1.0 as measured in a 0.5 weight percent solution of the polyurethane in dimethylformamide at 25° C., was plasticated in a C. W. Brabender Plastograph with a 55 gram capacity at 200° C. for 15 minutes, under a nitrogen blanket.

The resultant modified oxymethylene polymer was tacky.

The notched Izod impact strength as determined by ASTM procedures of samples molded from this polymer was no break at 73° F.

EXAMPLE II

The procedure of Example I was followed except that 0.25 gram of unstabilized polyoxymethylene homopolymer with a molecular weight of about 3,000 was incorporated in the Plastograph along with the other reactive components.

After 15 minutes of plastication of a modified oxymethylene, copolymer was produced which was non-tacky.

The notched Izod impact strength as determined by ASTM procedures, of samples molded from this polymer was no break at 73° F.

What this example shows is that the incorporation of a small amount of a formaldehyde generating source which will freely generate formaldehyde when mechanically worked at the temperatures necessary for producing the modified oxymethylene copolymers, according to the instant invention, into the reactive mixture will produce non-tacky modified oxymethylene copolymers.

Additionally this example describes that the impact properties of the thusly produced non-tacky modified oxymethylene copolymers are not reduced.

It is to be understood that the foregoing detailed description is given merely by way of illustration and that many variations may be made therein without departing from the spirit and scope of the invention.

What is claimed is:

1. In a process for the production of modified oxymethylene copolymers by the coupling reaction of an oxymethylene copolymer and a polyurethane end-capped by a coupling agent selected from the group consisting of isocyanates and isothiocyanates, said isocyanate or isothiocyanate being present in amounts between about 0.5 mole to about 3.0 moles per mole of active hydrogen on the oxymethylene copolymer, the improvement which comprises forming said modified oxymethylene copolymer in the presence up to about 10 weight percent based on the total weight of the reactive components of excess formaldehyde.

2. The process of claim 1 wherein the coupling reaction is performed in the melt state at a temperature between about 100° C. to 275° C. while being mechanically worked.

3. The process of claim 2 wherein the oxymethylene copolymer has a molecular weight of at least 10,000 and is present at from about 20 to about 80 weight percent based upon the total weight of the reactive components.

4. The process of claim 3 wherein the excess formaldehyde is supplied by a formaldehyde generating source which will freely generate formaldehyde when mechanically worked at the temperatures necessary for forming the modified oxymethylene copolymer, and the coupling reaction is performed at a temperature between about 150° C. to 250° C.

5. The process of claim 4 wherein the formaldehyde generating source is an unstabilized oxymethylene homopolymer with a molecular weight of up to about 10,000.

6. The process of claim 5 wherein the oxymethylene copolymer is present at from about 40 to about 60 weight percent based upon the total weight of reactive components.

7. The process of claim 6 wherein the formaldehyde generating source is an unstabilized oxymethylene homopolymer with a molecular weight of from about 200 to about 3,000 and is provided in amounts of from about 0.1 to about 2 weight percent based upon the total weight of reactive components.

References Cited

UNITED STATES PATENTS

| | | | |
|---|---|---|---|
| 3,642,942 | 2/1972 | Castner | 260—858 |
| 3,364,157 | 1/1968 | Halek | 260—858 |
| 3,087,912 | 4/1963 | Wagner | 260—77.5 AM |

FOREIGN PATENTS

| | | | |
|---|---|---|---|
| 1,017,244 | 1/1966 | Great Britain. | |
| 1,193,231 | 5/1970 | Great Britain | 260—858 |

PAUL LIEBERMAN, Primary Examiner

U.S. Cl. X.R.

260—13, 67 FP, 75 NH, 75 NP, 77.5 AM